March 19, 1940.   C. W. GERMECK   2,194,303
RADIO NOISE TESTING EQUIPMENT
Filed March 12, 1938    4 Sheets-Sheet 1

Inventor:
Carl W. Germeck,
by Harry E. Dunham
His Attorney.

March 19, 1940.  C. W. GERMECK  2,194,303
RADIO NOISE TESTING EQUIPMENT
Filed March 12, 1938  4 Sheets-Sheet 3

Inventor:
Carl W. Germeck,
by Harry E. Dunham
His Attorney.

March 19, 1940.  C. W. GERMECK  2,194,303
RADIO NOISE TESTING EQUIPMENT
Filed March 12, 1938   4 Sheets-Sheet 4
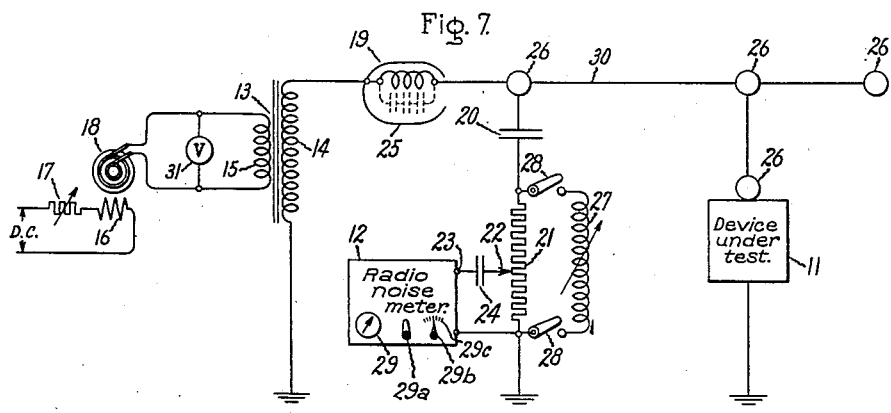
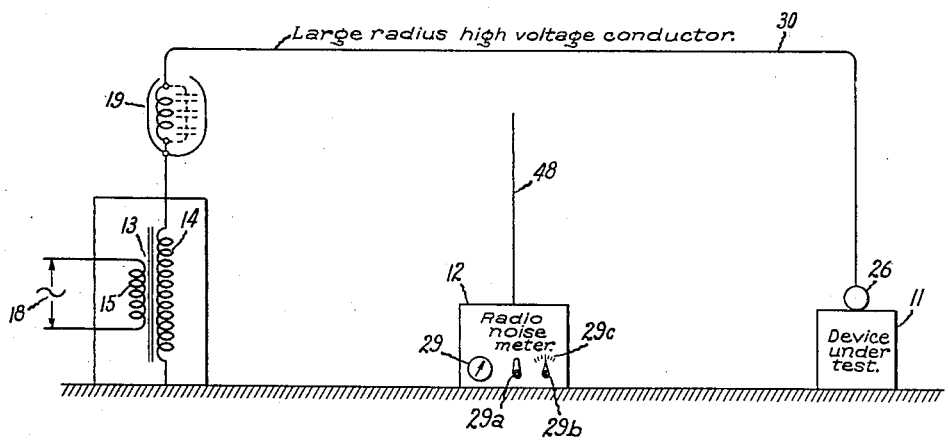
Inventor:
Carl W. Germeck,
by Harry E. Dunham
His Attorney.

Patented Mar. 19, 1940

2,194,303

UNITED STATES PATENT OFFICE 2,194,303

RADIO NOISE TESTING EQUIPMENT

Carl W. Germeck, Pittsfield, Mass., assignor to General Electric Company, a corporation of New York Application March 12, 1938, Serial No. 195,577

2 Claims. (Cl. 175—183)

My invention relates to methods and apparatus for testing dielectric devices and anticipating deterioration thereof.

An object of my invention is to provide an arrangement for detecting defects in dielectric devices.

Another object is to provide an arrangement for determining the size and location of voids, fissures and faults in insulating material without destruction thereof.

Still another object of my invention is to provide an arrangement for conveniently testing dielectric devices in the field.

Other and further objects and advantages will become apparent as the description proceeds.

In carrying out my invention in its preferred form, in general, I apply a voltage of commercial frequency, that is, of rated frequency to electrical apparatus, the dielectric of which is to be tested. Defects or faults in the dielectric device are detected by obtaining an indication or a measurement of the radio noise produced by the device under test. The test may consist either of ascertaining the voltage at which radio noise starts or the actual magnitude of radio noise at a predetermined value of voltage. Preferably both results are taken into consideration. The radio noise may be detected or measured with a radio noise meter which is either directly coupled to the circuit of the device under test or picks up radio noise that is radiated.

Figure 1:
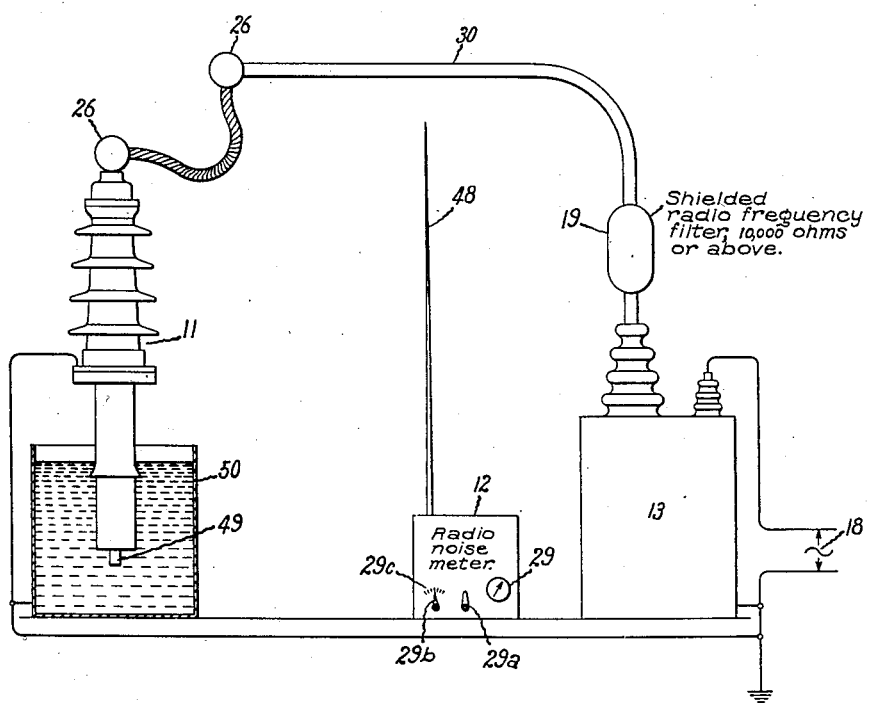
Figure 2:
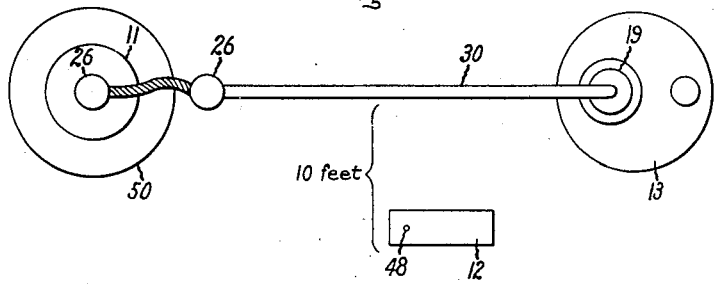
Figure 3:
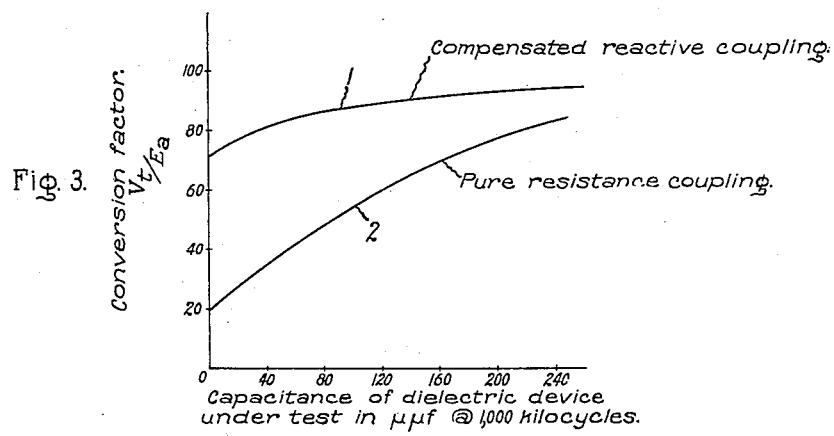
Figure 4:
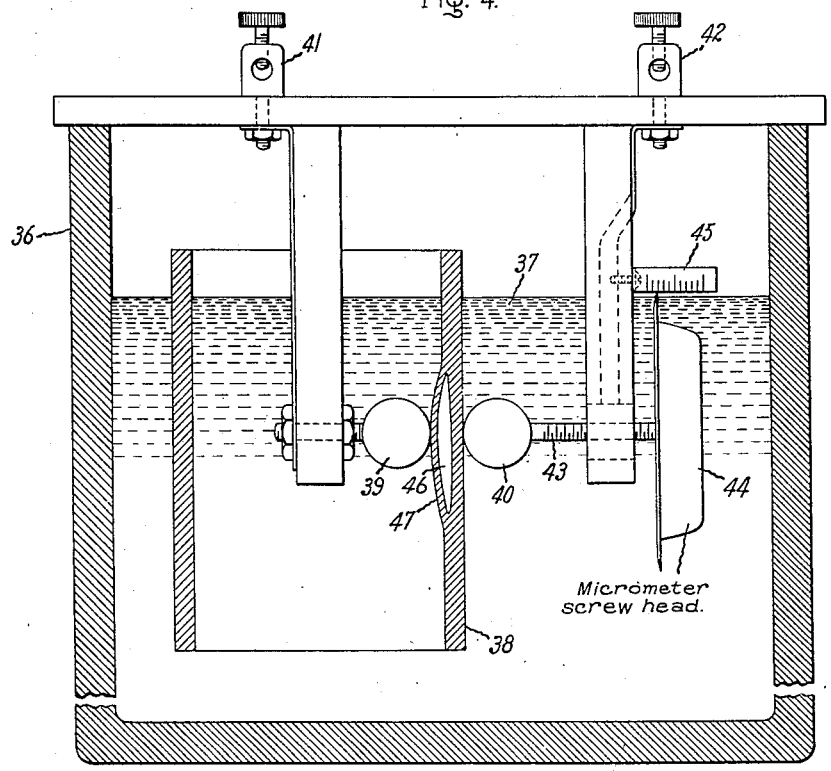
Figure 5:
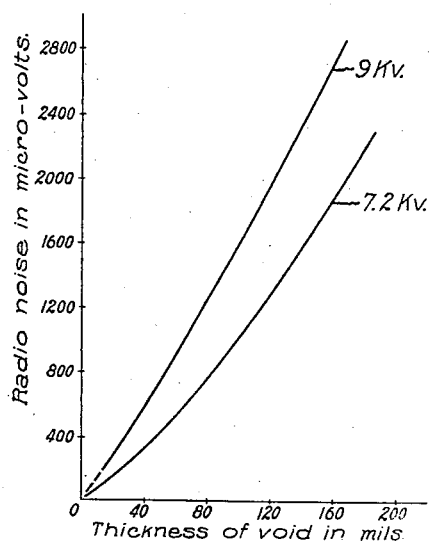
Figure 6A:
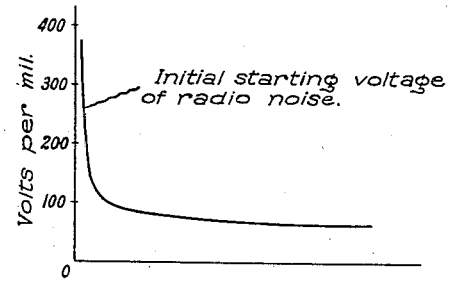
Figure 6B:
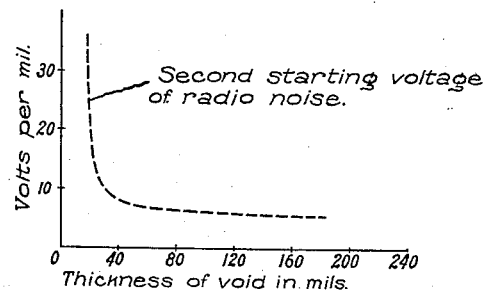

The invention will be understood more readily from the following detailed description when considered in connection with the accompanying drawings and those features of the invention which are believed to be novel and patentable will be pointed out in the claims appended hereto. In the drawings Fig. 1 is an elevation of the testing apparatus upon which a test is carried out in accordance with one embodiment of my invention. Fig. 2 is a plan view of the apparatus of Fig. 1. Fig. 3 is a graph showing the conversion factors giving the relationship between measurements obtained by the direct coupling method and the radiation method. Fig. 4 is an elevation, principally in section, of a test unit used for studying radio noise characteristics of voids in insulating material. Fig. 5 is a graph showing the variation of radio noise with size of voids in insulating material. Figs. 6A and 6B are graphs showing the variation of the radio noise starting gradient with size of void, Fig. 6A referring to the original starting point and Fig. 6B to the starting point after initial ionization. Fig. 7 is a schematic diagram illustrating the arrangement of the apparatus for making tests by my direct coupling method and Fig. 8 is a schematic diagram showing the arrangement of apparatus for making tests by my radiation method. Like reference characters are utilized throughout the drawings to designate like parts.

There are, in general, two principal methods of carrying out my invention, the direct coupling method one form of which is represented schematically in Fig. 7 and the radiation method an example of which is represented schematically in Figure 8. Either method may be used in the field or in the laboratory, but the direct coupling method is ordinarily preferable for precise laboratory determinations for the reason that interference from extraneous noises is reduced to a minimum and measurement can be made with greater accuracy because the circuit constants can be determined with certainty. However, results of tests made by one method may be stated in terms of the other by utilizing a conversion factor which I shall later explain.

In the arrangement of Fig. 7, a dielectric device 11 to be tested such as a high voltage bushing, for example, is connected to a suitable source of commercial-frequency alternating current and the radio-frequency component of the voltage across the device is detected or measured by means of a suitable instrument such as a radio noise meter 12 suitably coupled to the device 11 under test. The source of alternating current for energizing the apparatus may consist of a transformer 13 having a secondary winding 14, a primary winding 15, and a suitable arrangement for varying the output voltage such as an induction regulator or a generator field control arrangement. For example, the primary winding 15 may be connected to a variable voltage alternator 18 having a direct current field 16 in series with which a voltage control rheostat 17 is connected. Preferably all the apparatus is grounded on the low voltage side. A radio frequency filter 19 is inserted in the connection between the high side of the transformer secondary winding 14 and the device 11 in order to prevent possible radio noise from the supply source entering the measuring circuit and also to introduce a high impedance to the radio noise current generated by the device under test so that practically all the radio frequency current thus generated will flow through the coupling or measurement circuit.

The radio noise meter 12 may be capacitatively coupled to the device 11 by means of a circuit including a coupling capacitor 20, which may be a paper dielectric condenser, and a resistor 21. In order to permit adjusting the sensitivity of the radio noise meter 12, the resistor 21 may be in the form of a potentiometer with a movable tap 22 connected to the ungrounded or antenna terminal 23 of the radio noise meter in series with a dummy antenna 24 in the form of a capacitor. To avoid corona a shield 25 surrounding the filter 19 is provided with rounded corners and junction points in the high voltage connecting line 30 are surrounded by spheres 26. If desired a capacitance-compensating adjustable reactor in the form of a variometer 27 may be connected in series or in shunt with the resistor 21. In the arrangement illustrated there are switches 28 which may be closed for connecting the variometer 27 in shunt. The variometer 27 is preferably so adjusted as to give the circuit a power factor of at least 98% at 1000 kilocycles. Suitable means are provided for measuring the applied voltage. If the transformer 13 is calibrated, the voltage may be ascertained with sufficient accuracy from a voltmeter 31 connected in the primary side.

Although I find it more convenient to obtain the requisite voltage by using an alternating current source of testing voltage it will be understood that my invention is not limited thereto and D. C. may be used, in which the calibration of the apparatus would be different.

The radio noise meter 12 may be of any desired type, e. g., an instrument such as that described in the General Electric Review, volume 36, pages 201–205 inclusive, April 1933, including a calibrated adjustable signal generator and a radio receiver in the same case. The receiver may be used as a detector or comparator for use in adjusting the signal generator to give the same deflection on a measuring instrument as a signal received from the coupling circuit 20—21. The receiver circuit of the radio noise meter is essentially that of a tuned-radio-frequency broadcast receiver of special design, having a milliammeter 29 in the output stage instead of head phones. However, in certain portions of my test the head phones or some type of simple current indicator may be used instead of a measuring device such as the milliammeter 29. There is a changeover switch with a handle 29a for causing either the signal generator or the coupling circuit 20—21 to affect the receiver, and a signal-generator strength control with a movable handle 29b cooperative with a scale 29c calibrated in signal strength.

My invention is not limited to the use of particular circuit constants but I have found that satisfactory results may be obtained by using the following values, e. g.:

Impedance of filter 19 at least 6000 ohms at the most commonly used frequency for the present purpose 1000 kilocycles.

Reactance of coupling capacitor 20 at broadcast frequencies, not more than 60 ohms.

Capacity of dummy antenna capacitor 24, 21 micromicrofarads.

Resistance of resistor 21 such as to give a value of 600 ohms to the resistive component of the impedance of the entire circuit connected to the terminals of the device 11 under test, this terminating impedance having only a negligible reactive component.

Diameter of spheres 26, 5 inches and

Diameter of high tension conductor 30, 2 inches, assuming a test voltage circuit of 100 kilovolts. Both diameters would be increased for higher voltages.

When a dielectric device, such as an insulating bushing, for instance, is to be tested the following procedure may be followed. The device is connected to the test circuit as shown in Fig. 7, for example, and the voltage is applied, gradually being raised until radio noise is first observed. Thereupon the applied voltage is measured by means of the voltmeter 31. The commencement of radio noise is ascertained by observing a deflection of the milliammeter 29 of the radio noise meter 12 or by listening in head phones (not shown) connected to the radio noise meter. I have found that the point of commencement of radio noise is usually rather pronounced, probably due to the formation of corona in the internal spaces of insulating material at a definite voltage. The voltage is then raised to the normal rated voltage of the apparatus under test and the magnitude of the radio noise is measured by reading the setting of the signal strength control handle 29b on the scale 29c, and applying the proper multiplying factor determined by the setting of the tap 22 on the potentiometer 21. It will be understood that the setting of the handle 29b is made such that the milliammeter 29 gives the same reading whether the changeover switch 29a is in the calibrating position or the noise measuring position. The applied voltage is then increased to some overvoltage such as 120% or 125% rated voltage and radio noise is measured again. The applied voltage is thereupon reduced to zero and gradually raised again until radio noise starts. The voltage at which radio noise starts the second time is noted and the magnitude of radio noise may be read again at elevated voltage. The second starting voltage of radio noise is usually lower than the first owing to some action which I have considered as ionization. From these measurements and observations, I am able to detect defective devices, and to predict failure as well as to ascertain information in regard to the nature and location of defects.

Owing to the wide variety of shapes, sizes and types of dielectric devices which may be tested by my arrangement, I consider it preferable to base the determination of the significance of results obtained from a device under test, upon a comparison with results obtained from a similar device known to have given satisfactory service or subsequently disassembled or torn apart and examined by other methods. In general, either a low starting voltage of radio noise or a high value at a given voltage signifies that the device is defective.

The manner in which more detailed information is obtained in regard to the properties of an insulating device will be understood by considering, for example, the classes of apparatus such as transformers or high voltage bushings in which there is a conductor immersed in oil surrounded by a hollow insulating cylinder or tube of such size as to form an oil duct between it and the conductor and composed of layers of fibrous material wound flat-wise and bonded together or impregnated with insulating compound. Examples of insulating cylinders used in this manner are to be found in Patents 1,979,096, Cahall, June 1, 1934; 1,953,779, Sclater et al., April 3, 1934; 1,350,936, Peek, August 24, 1920; 2,099,666, Terpak, November 16, 1937, and others. In order to determine the interpretation to be given test data on such apparatus, I have carried out my method of test on such apparatus and also upon insulating tubes tested separately and have found that in either case test data may be interpreted in the manner shown in the following tabulation:

| Class | Radio noise characteristics | | | Fault interpretation |
|---|---|---|---|---|
| | Initial starting point | Second starting point | Value at 125% rated voltage | |
| 1 | High or none. | | Very low or none. | None—normal condition. |
| 2 | High | | Very high | (a) Void or fissure in insulating compound or in outer-layers of insulating cylinder. (b) Large number of small voids usually from wrinkles in insulating cylinder. |
| 3 | Low | | High | (a) Void or fissure in insulating cylinder near the conductor. (b) Partial breakdown of insulation leading to class 4. |
| 4 | do | | Low | Breakdown of insulation (near conductor) due to void or foreign matter. |
| 5 | High | Very low | | Sealed voids in insulating cylinders. |

Although I have described a detailed method of procedure by way of illustration it will be understood that my invention is not limited to precise duplication in every particular of the illustrative procedure.

I have found that sealed voids possess noise characteristics so distinctive that a simple noise test even without actual measurement of the magnitude of the noise quickly indicates their existence. I have found also that the magnitude of the noise decreases with an increase in the size of the oil duct and is roughly proportional to the thickness of the void; that the second starting voltage increases with the size of the oil duct, and is somewhat higher with very small voids. From tests on cylinders as in Fig. 4, confirmed by observations on cylinders used in transformers, I have found that the voltage gradient of the original starting voltage of radio noise is in good agreement with the critical strength of air at atmospheric pressure and that the second starting point is about one-eighth of this value. Naturally the original starting voltage depends upon the previous stress applied to a void. Furthermore, I have found that the voltage gradient of the second starting voltage of radio noise is independent of the size of the duct but increases rapidly for void thicknesses below twenty mils.

It appears that where a void or air pocket occurs in insulating material the resulting stress is sufficient to start internal corona or to cause partial insulation breakdown at normal voltages.

The graph shown in Fig. 5 illustrates the relationship between void thickness and intensity of radio noise in microvolts for two different applied voltages of 9 kilovolts and 7.2 kilovolts, respectively. The graphs of Figs. 6A and 6B illustrate the relationship between the void thickness and the voltage gradient of the starting voltage of radio noise, Fig. 6A being for the initial starting voltage and Fig. 6B for the second starting voltage. The graphs of Figs. 6A and 6B are plotted to the same scale along the horizontal axis but to different scales along the vertical axis.

Fig. 4 illustrates a type of test unit which I have used for arriving at the interpretation to be placed upon test results particularly in the case of apparatus containing insulating cylinders immersed in oil. In the unit of Fig. 4 there is a tank 36 containing insulating oil 37 in which a blistered insulating cylinder 38 and a pair of electrodes 39 and 40 are immersed. The electrodes 39 and 40 are electrically connected to terminals 41 and 42, respectively, to which the test voltage is applied, the unit in the tank 36 takes the place of the device 11 under test in Fig. 7. The electrode 39 is rigidly mounted and the electrode 40 is movably mounted, being carried by a micrometer screw 43 having a screw head 44 graduated and cooperating in the usual manner with an index and scale 45. The electrodes 39 and 40 are shown as being on either side of a void in the cylinder 38. The presence of the void or air pocket 46 in the disassembled cylinder 38 is made manifest by the blister 47. The thickness of the void 46 may be determined from the difference in spacing between the electrodes 39 and 40 when the blister 47 is placed between them and when some unblistered portion of the cylinder 38 is between the electrodes. For simulating an oil duct between a conductor and an insulating member one of the electrodes 39 or 40 was backed away the desired distance from the surface of the insulating cylinder 38. In the actual apparatus illustrated in Fig. 4 the electrodes 39 and 40 were one-inch diameter spheres but it will be understood that electrodes of different dimensions may be employed.

It is apparent that a mass of data with respect to the relationship between magnitude and starting voltage of radio noise and size, location and nature of defects in insulation may be obtained with greater facility by means of tests in units such as illustrated in Fig. 4 than by tests on completed electric apparatus which must be disassembled and must often have the insulation torn apart or cut open after the test to verify the predictions as to significance of radio noise measurement stated in the tabulation given above and in the graphs referred to. However, I have found the results of radio noise measurements on completed apparatus and upon blistered cylinders to be in agreement.

In the foregoing I have made particular reference to transformers and high voltage bushings but it will be understood that the suitability of my method of test by observation of radio noise is not limited to these specific types of apparatus but is highly useful for testing dielectric devices in general. In the description and claims, I use the term "dielectric device" to refer broadly to apparatus and materials such as electric insulating substances, insulators, high voltage bushings, condensers, circuit breakers, transformers, reactors, insulated electric cables, lightning arresters, cutouts, and other apparatus which is insulated or contains electric insulating or high resistance material.

Although my testing arrangement is not intended to replace entirely all other methods of testing dielectric devices, such as power-factor measurement, leakage resistance measurement, and hi-pot tests, and in some cases may be regarded as supplementary to one or the other of these methods of test, I have found my method of test to be effective in certain cases where the other methods of test have failed completely. For example, for a power factor measurement to indicate that some fault exists in a piece of dielectric material, there must be sufficient dielectric loss at some point to increase the power factor appreciably above normal. I have found that dangerous voids can exist in high voltage insulations with very little or no attendant additional dielectric loss, in which case the power factor remains quite normal.

In the arrangement of Fig. 7, the radio noise meter 12 is in effect nothing more than a voltmeter which is arranged to read only the radio frequency component of voltage across the device 11 under test. In the cases illustrated the 1000 kilocycle component is measured. The value of my test for detecting defective dielectric devices arises, I believe, from the fact that the presence of voids or defects in high voltage insulations usually causes ionization to exist when the insulation is under alternating stress. The resultant ionization currents are non-sinusoidal in wave shape and have components extending up into the radio frequency region. Consequently, the radio noise meter is a very sensitive detector of such ionization currents and, hence, a sensitive detector of voids and other defects in dielectric devices.

It is often possible to design apparatus so that no radio noise will occur until rated voltage is exceeded and many classes of apparatus are so designed. In general, any piece of apparatus will not give rise to radio noise until the insulation is overstressed. On account of limitations of cost or available space, however, it is not always feasible to design apparatus with no radio noise. Many types of high voltage apparatus have a certain level of radio noise at operating voltage and still give perfectly satisfactory service. My testing arrangement makes it possible to detect defective apparatus by reason of marked deviation from the radio noise characteristics of acceptable apparatus and also makes it possible to establish quantitative standards of insulation quality so that controversies between manufacturers and purchasers may be eliminated on the question of the fitness for the purpose of dielectric devices.

All of the test apparatus illustrated in Fig. 7 may be mounted upon wheeled trucks so as to be portable and adapted for making tests in the field. If the device under test is one which must inherently be grounded on one side, this circumstance does not interfere with the use of the test arrangement since the test apparatus operates equally well with a ground return or a return conductor.

In cases where the radiation method of test is preferred, the test apparatus may be arranged as in Fig. 8. In this case also the test apparatus may be portable for making tests in the field. The radio noise meter 12 is not directly coupled to the test circuit, but is provided with an antenna 48 which picks up radiation from the high voltage conductor 30. Consequently, the radio noise meter in this case measures, not the radio frequency component of voltage across the tested device 11, but the radio frequency component of the potential gradient at the antenna 48 produced by defects in the device 11. The manner of conducting the tests is otherwise the same as explained in connection with Fig. 7.

In order to facilitate conversion of readings of radio noise in microvolts to readings in microvolts per meter and vice versa, the apparatus of Fig. 8 is preferably arranged with certain standard dimensions wherever possible. For example, the highest portion of the high voltage conductor may be 10 feet above the ground and ten feet in horizontal length and the antenna 48 of the radio noise meter 12 may be offset ten feet from the center of the horizontal portion of the high voltage conductor 30. The antenna 48 may have an effective height of one meter. The actual height required will depend upon the electrical constants of the radio noise meter.

The offset arrangement of the radio noise meter 12 is shown in Fig. 2 which is a plan view of the apparatus shown in elevation in Fig. 1. In Figs. 1 and 2 actual apparatus is illustrated for carrying out a test by the radiation method illustrated schematically in Fig. 8. In Figs. 1 and 2 the device 11 under test is shown as a high voltage bushing with a conductor 49 extending through the bushing. The lower end of the conductor 49 is immersed in an oil tank 50 in order to prevent corona formation.

The factor for converting readings of microvolts per meter obtained in the radiation method of Fig. 8 to microvolts which would be obtained in the direct coupling method of Fig. 7 may be determined by mathematical calculation from the approximated electrical constants of the circuits of Fig. 8. This factor is $$V_t/E_a = \frac{C_a+C_b}{C_b}\sqrt{\frac{(R_c^2+X_c^2+X_cX_b)^2+(R_cX_b)^2}{R_c^2+(X_c+X_b)^2}} \quad (1)$$

where $V_t$ = voltage across terminals of test device, in volts measured by direct coupling method.

$E_a$ = potential gradient at the noise meter antenna in volts per meter obtained by the radiation method.

$w$ = 6.28 times the frequency in cycles per second to which the radio noise meter 12 is tuned.

$R_c$ = the resistive component of the impedance of the coupling circuit 20—21 of Fig. 7, measured in ohms.

$C_a$ = capacitance of the antenna 48 to ground in farads.

$C_b$ = capacitance of a device 11 under test measured at its terminal in farads.

$X_c$ = the reactive component of the impedance of the coupling circuit measured in ohms.

$X_b$ = the reactance of the antenna 48.

$$= \frac{1}{wC_a}$$

If the coupling circuit is made purely resistive Equation 1 becomes $$V_t/E_a = \frac{wR_c(C_a+C_b)}{\sqrt{1+w^2R_c^2C_b^2}} \quad (2)$$

It will be seen that Equations 1 and 2 give the conversion factor in terms of the capacitance $C_b$ of the dielectric device under test, the other terms of the equation being fixed by the dimensions of the test apparatus.

Equations 1 and 2 have been plotted as curves 1 and 2 of Fig. 3 for a radio frequency of a million cycles, using a value of 600 ohms for the resistor 21 in Fig. 7 and a value of one meter as the effective height of the antenna 48 in Fig. 8. With the curves of Fig. 3 available I may quickly convert readings taken by the radiation method into equivalent readings which would be obtained by my direct coupling method and vice versa.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States, is:

1. The method of testing dielectric devices which comprises applying a source of alternating current to the device being tested, gradually raising the voltage of the source to a predetermined value bearing a fixed relationship to the rated voltage of the device, observing the point at which a radio frequency component first appears in the voltage across the device while the voltage is being raised, reducing the voltage of the source, gradually raising the voltage again, observing the point at which a radio frequency component again appears in the voltage across the device and determining a characteristic of the device from the difference between the point at which the radio frequency component again appears and the point at which the radio frequency component first appeared.

2. The method of testing dielectric devices which comprises applying a source of alternating current to the device being tested, gradually raising the voltage of the source to a predetermined value bearing a fixed relationship to the rated voltage of the device under test, observing the voltage gradient at which a radio frequency component first appears in the voltage across the device while the voltage of the source is being raised, reducing the voltage of the source, gradually raising the voltage of the source, observing the voltage gradient at which a radio frequency component again appears in the voltage across the device and determining a characteristic of the device from the difference between the voltage gradient at which the radio frequency component again appears and the voltage gradient at which the radio frequency component first appeared.

CARL W. GERMECK.